UNITED STATES PATENT OFFICE.

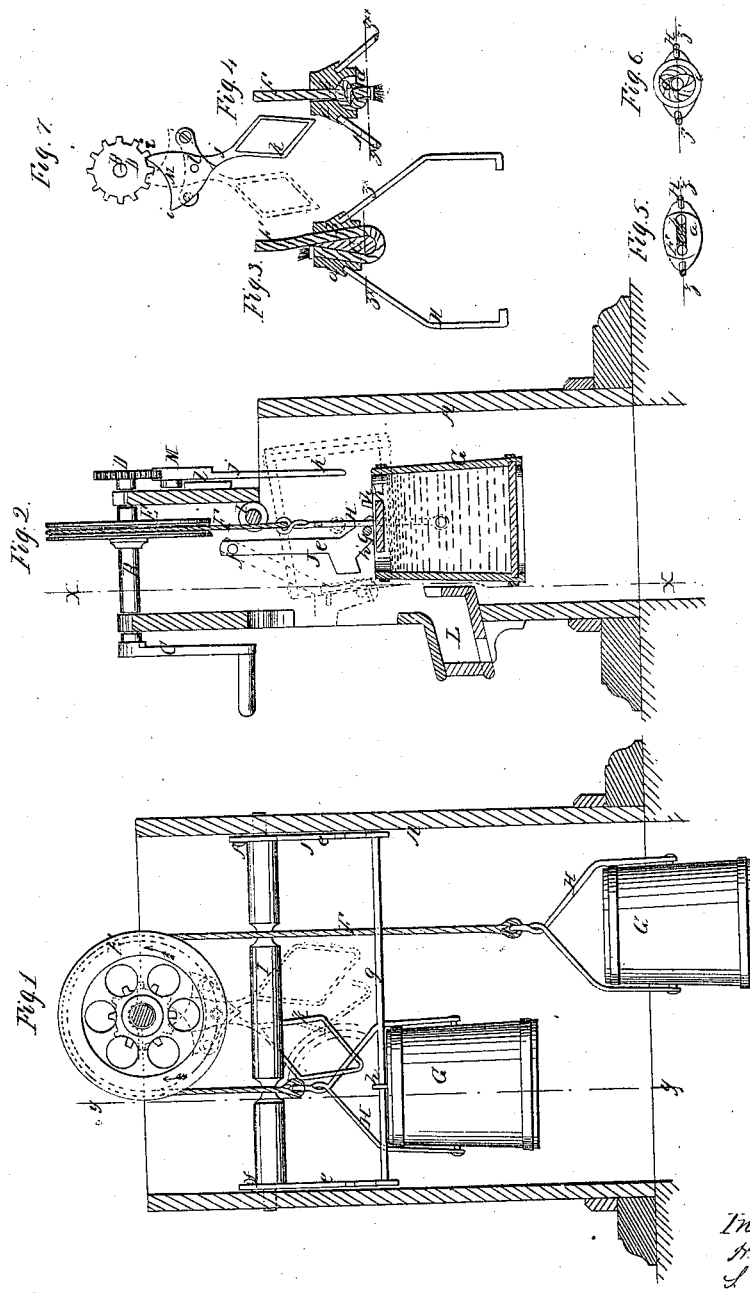

H. J. BAILEY AND S. S. WILLIAMS, OF PITTSBURG, PENNSYLVANIA.

IMPROVEMENT IN WATER-ELEVATORS.

Specification forming part of Letters Patent No. 43,966, dated August 30, 1864.

*To all whom it may concern:*

Be it known that we, H. J. BAILEY and S. S. WILLIAMS, of Pittsburg, in the county of Allegheny and State of Pennsylvania, have invented certain new and useful Improvements in Water-Elevators; and we do hereby declare that the following is a full, clear, and exact description of the same, reference being had to the accompanying drawings, making a part of this specification, in which—

Figure 1 is a front sectional view of our invention, taken in the line $x\ x$, Fig. 2; Fig. 2, a side sectional view of the same, taken in the line $y\ y$, Fig. 1; Figs. 3 and 4, detached sectional views of the means employed for securing the rope to the buckets, $z\ z\ z'\ z'$, Figs. 5 and 6, indicating the lines of section; Figs. 5 and 6, sections of Figs. 3 and 4, looking upward and taken in the lines $z^x\ z^x\ z^{xx}\ z^{xx}$; and Fig. 7, a detached view of a pawl and ratchet.

Similar letters of reference indicate corresponding parts of the several figures.

This invention relates to a new and improved water-elevating device, in which a rope and buckets are employed.

The invention consists in an improvement in the means employed for tilting the buckets, and in a self-acting pawl-and-ratchet arrangement for preventing the casual descent of the buckets into the well, as well as an improved manner of attaching the rope to the bails of the buckets, as hereinafter fully set forth.

To enable those skilled in the art to fully understand and construct our invention, we will proceed to describe it.

A represents a well-curb, which may be of rectangular or other suitable form, and B is a shaft placed on the upper end of the well-curb, having a crank, C, at one end of it, a ratchet-wheel, D, at the opposite end, and a wheel or pulley, E, upon it, which is within the curb.

F is the well-rope, which passes over the pulley E, and has a bucket, G, attached to each end. These buckets G are each provided with a bail, H, arranged in the usual way, so far as their attachment to the buckets is concerned. Each bail H is provided with a metal knob, $a$, at the center of its upper part, and these knobs have each a hole, $b$, made centrally through them, through which the ends of the rope F are passed, and said ends may be secured to the knobs by means of a key or wedge, $c$, inserted in the lower ends of the holes $b$, with the end of the rope doubled around it, as shown, in Figs. 3 and 5, or a knot, $d$, may be tied in the end of the rope to prevent the same from being drawn through the knobs, as shown in Figs. 4 and 6. By this means the rope F may be attached to the buckets with the greatest facility and in a secure manner.

I is a roller, which is placed in the upper part of the curb A, and in line with the rope F at both sides of the pulley E, so that the rope will work in contact, or nearly so, with said roller.

J is a bucket-tripping device, composed of two bent bars, $e\ e$, attached by pivots $f$, near their upper ends, to each side of the well-curb A. The lower ends of the bars $e\ e$ are connected by a rod, $g$. The bars $e\ e$ are allowed to swing freely on the pivots $f$, and the weight or gravity of said bars, in connection with the rod $g$, is sufficient to keep the latter in contact with the rope F. Each bucket G has a bar, K, attached to its upper end, extending centrally across it, with the pins $h\ h$ driven obliquely into it, as shown clearly in Fig. 2.

L is a trough at the front of the well-curb, into which the water is discharged from the buckets.

The tilting operation of the buckets is as follows: As a filled bucket is drawn up, its bar K comes in contact with the rod $g$, which tilts it, and at the moment of tilting the bail H comes in contact with the roller I, which prevents the bucket from being thrown backward, the bars $e\ e$ and rod $g$ at the same time swinging forward, so that the bucket may assume a position which will admit of a free escape of all the water from it. (See red lines in Fig. 2.)

M is a pawl, which is constructed of a metal plate, hollowed out at its upper surface, so as to form a tooth, $i$, at each side, as shown in Fig. 7. This pawl is attached to to the upper end of a rod, $j$, the lower part of which is bent in diamond form, as shown at $k$ in Figs. 1 and 7, and the pawl works on a pivot, $l$, at the rear side of the well-curb, just below the ratchet D. The pawl is nicely balanced on the pivot $l$, so that the slightest touch will move it either way to cause either tooth to engage with the ratchet, one tooth engaging with the ratchet as the other is disengaged from it. The pawl engages with the ratchet, so as always to hold the ascending bucket, and as said bucket reaches its culminating-point its bail H or the bucket itself strikes the lower part of the rod $j$ and throws the tooth $i$ which was engaged with the pawl during the ascent of the bucket out of gear with the pawl M, and throws the other tooth in gear therewith, so that the bucket in the well will, while ascending, be held up or prevented from casually dropping. Thus by this simple arrangement the holding-pawl is rendered self-acting.

Having thus described our invention, what we claim as new, and desire to secure by Letters Patent, is—

1. The bars $e\ e$, pivoted at the upper ends to the sides of the curb A, and connected at their lower ends by the rod $g$, in connection with the roller I or its equivalent, all arranged to operate in the manner substantially as and for the purpose herein set forth.

2. The pawl M, provided with or attached to the rod $j$ and balanced on the pivot $l$, in connection with ratchet D, all arranged to operate in the manner substantially as and for the purpose herein set forth.

H. J. BAILEY.
S. S. WILLIAMS.

Witnesses:
A. S. NICHOLSON,
ROBERT HAGUE.